United States Patent
Lich

[15] 3,651,766
[45] Mar. 28, 1972

[54] LOCOMOTIVE TRUCK

[72] Inventor: Richard L. Lich, Town and Country, Mo.

[73] Assignee: General Steel Industries, Inc., St. Louis, Mo.

[22] Filed: Jan. 30, 1970

[21] Appl. No.: 7,137

[52] U.S. Cl. ..........................105/136, 105/196, 105/199 R, 105/200, 105/453
[51] Int. Cl. .......................B61c 9/48, B61f 5/02, B61f 5/14
[58] Field of Search ...............105/136, 196, 199 R, 200, 453

[56] References Cited

UNITED STATES PATENTS

| | | | |
|---|---|---|---|
| 3,451,355 | 6/1969 | Dobson et al. | 105/136 |
| 2,515,812 | 7/1950 | Waldrogel et al. | 105/199 R |
| 2,852,248 | 9/1958 | Travilla et al. | 105/200 X |
| 2,954,747 | 10/1960 | Hirst et al. | 105/196 |
| 3,557,709 | 1/1971 | Hulfing et al. | 105/199 R |

FOREIGN PATENTS OR APPLICATIONS

| | | | |
|---|---|---|---|
| 807,135 | 1/1959 | Great Britain | 105/199 R |

*Primary Examiner*—Arthur L. La Point
*Assistant Examiner*—Howard Beltran
*Attorney*—Bedell and Burgess

[57] ABSTRACT

The invention provides a three axle motor truck for railway locomotives in which the body load is transmitted in equal shares to the truck frame at four points symmetrically spaced transversely and longitudinally of the truck with respect to the axles. Preferably the body load is transmitted to the truck frame by elastomeric sandwich devices which are yieldable in horizontal shear to permit relative lateral and swivel movements between the truck frame and body underframe. The truck frame includes a pair of transverse transoms positioned respectively between the middle and each of the end axles, and for transmitting draft and braking forces between the truck frame and the underframe and providing a swivel center for the truck, a transverse lever is fulcrumed at its midpoint on a vertical axis to the underframe at the center of the truck, and its ends are connected respectively to the opposite transoms by longitudinally extending links. This arrangement provides a swivel center nearly symmetrical with respect to the load-transmitting sandwich devices so that for swivel, none is required to deflect an excessive amount in shear. The longitudinal spacing of the elastomeric sandwiches provides a long arm opposing tendencies of the truck frame to tip during acceleration and thus transfer load from axle to axle. This effect is also enhanced by having all the motors extend in the same direction from the axles to their reaction connection to the truck frame.

7 Claims, 3 Drawing Figures

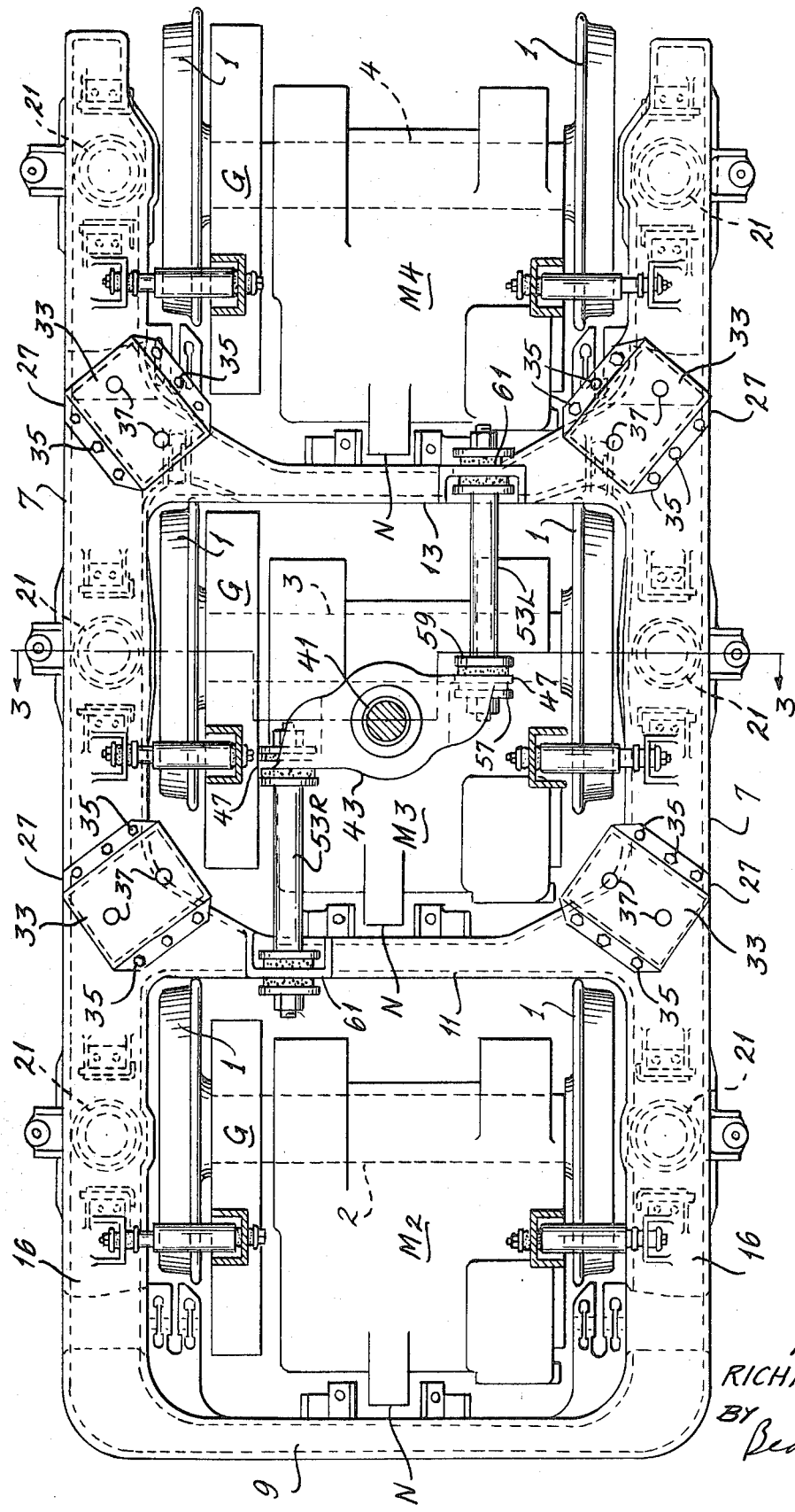

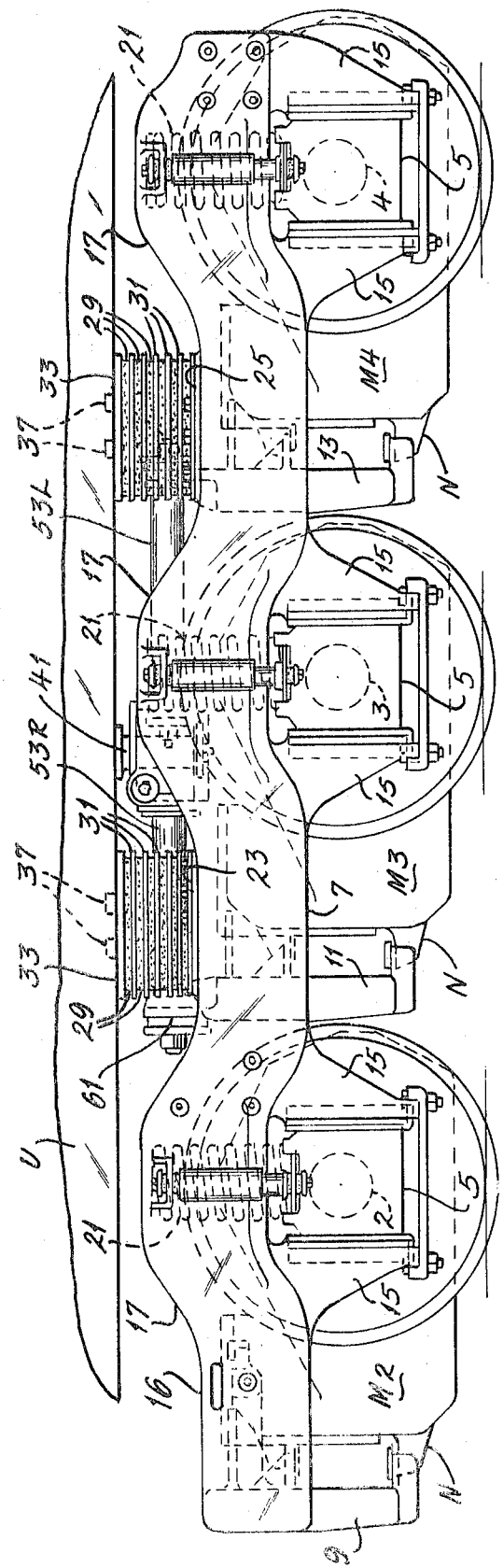
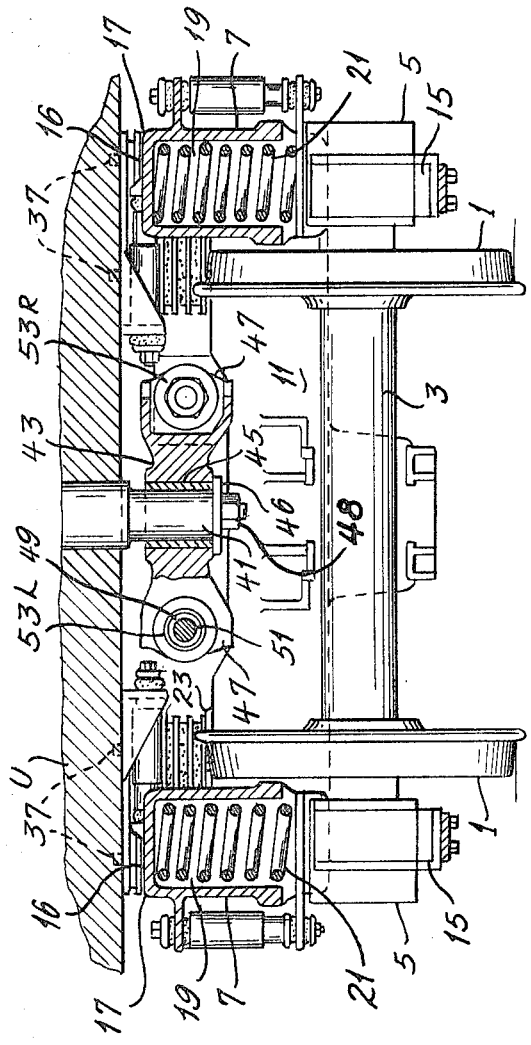

3,651,766

LOCOMOTIVE TRUCK

BACKGROUND OF THE INVENTION

1. Field of the Invention

The invention relates to railway rolling stock and consists particularly in a railway motor truck.

2. The Prior Art

The prior art includes railway motor trucks in which the truck frame symmetrically mounts a plurality of longitudinally and transversely spaced elastomeric pad devices supporting the underframe and yieldable in horizontal shear to accommodate relative swivel and lateral movement between the truck and underframe, and a vertical axis pivot connection between a truck frame intermediate transom and the underframe, the pivot connection being substantially off center longitudinally of the truck. With this prior art arrangement, the radius from the pivot device to at least two of the elastomeric pad devices is extremely long, necessitating an extremely large shear deflection in these pads to accommodate the maximum angle of swivel.

SUMMARY OF THE INVENTION

The invention provides a truck in which longitudinally spaced pair of elastomeric pads between the truck frame and underframe resist longitudinal tipping of the truck frame and thus oppose transference of weight from axle to axle, and in which the maximum radius of the pads from the swivel axis is substantially reduced by the provision of a swivel connection between the truck frame and underframe having the swivel axis substantially at the center of the truck and hence substantially centered with respect to both pairs of pads. The swivel connection comprises a transverse level fulcrumed on a vertical axis at its center to the underframe above the center of the truck, with longitudinal links extending respectively in opposite directions from the opposite ends of the lever to opposite intermediate transoms, thus leaving the space about the middle axle, between the intermediate transoms, clear for the middle axle motor.

BRIEF DESCRIPTION OF THE DRAWINGS

FIG. 1 is a plan view of a truck embodying the invention.

FIG. 2 is a side elevational view of the truck illustrated in FIG. 1.

FIG. 3 is a transverse vertical sectional view along line 3—3 of FIG. 1.

DESCRIPTION OF THE PREFERRED EMBODIMENT

The numeral 1 refers to railway flanged wheels arranged in gauged spaced pairs on transversely extending spaced railway axles 2, 3 and 4. Outboard of wheels 1, journal boxes 5 are mounted on the ends of axles 2, 3 and 4, the latter being rotatably received within boxes 5.

A rigid truck frame comprising longitudinally extending transversely spaced side members 7, positioned transversely outboard of wheels 1, and transverse transoms 9, 11 and 13 positioned respectively longitudinally outboard from axle 2, and intermediate axles 2 and 3, and 3 and 4, is carried by axles 2, 3 and 4. For positioning axles 2, 3 and 4 in the frame, side members 7 are formed with longitudinally spaced pairs of depending pedestal legs respectively forming jaws embracing and vertically slidably receiving journal boxes 5. Above each pedestal jaw the top wall 16 of frame side member 7 is bowed upwardly as at 17 to form a downwardly open spring pocket 19. Upright coil springs 21 seated on top of journal boxes 5 extend upwardly therefrom into pockets 19 and underlyingly engage the bottom surface of frame side member top wall 16 to resiliently support the truck frame on the axles, whereby to accommodate differential vertical movements of the axles as may be required by vertical irregularities in the track surface and to cushion the frame against shocks imparted to the wheels thereby.

For driving the truck, motors M2, M3 and M4 are journaled respectively on axles 2, 3 and 4 and their nose portions N, by which their torque reaction is carried into the truck frame, extend in the same direction from the respective axles, being resiliently supported respectively on transoms 9, 11 and 13. Motors M2, M3 and M4 are drivingly connected to their respective axles through gear boxes G. With this arrangement, it will be evident that the torque reaction of all motors on the truck frame will be in the same direction, either up or down, depending on the direction of movement, thus avoiding any tendencies to tip the truck frame and thus vary the load on the individual axles.

For supporting underframe U on truck frame 7, 9, 11, 13, the top wall 16 of the latter is formed at the respective junctures of intermediate transoms 11 and 13 with side members 7 with upwardly facing flat surfaces 23 and 25, and elastomeric pad devices, each comprising a flat metal base plate 27, a series of rectangular flat horizontal elastomeric pads 29 bonded to and interleaved by metal plates 31 and a top plate 33, are seated on surfaces 23 and 25 and are secured thereto by bolts 35 through base plates 27. Top plates 33 are each formed with a pair of upwardly directed bosses which fit into holes in underframe U and thus prevent movement of top plates relative to the underframe. With base plate 27 and top plate 33 thus anchored respectively to the truck frame and underframe, any relative horizontal movement therebetween is accommodated by shear deflection in elastomeric pads 29.

Tendencies of the underframe to rock laterally on the truck frame and of the truck frame to tip longitudinally of the underframe are opposed by the resistance of pads 29 to compression and the long arms defined by the spacing of the pad devices from each other transversely and longitudinally of the truck.

To provide clearance for the middle axle motor M3 it is desirable that the truck be free of frame members in the space defined by intermediate transoms 11 and 13 and frame side members 7. At the same time, it is desirable that the swivel axis of the truck be positioned substantially centrally of this space, because if it is positioned on one of transoms 11 or 13 (in the manner of the prior art), the truck swivel will be asymmetric, and the elastomeric pad devices on the other transom will be required to deflect an excessive amount in shear because of their long radius from the swivel axis, to accommodate maximum swivel.

Accordingly, I provide a traction transmitting connection between the underframe and the truck, which is constructed to provide swivel about a vertical axis substantially at the center of the truck and to permit limited movement of the underframe laterally of the truck so as to cushion shocks transmitted by lateral irregularities in the track rails.

The traction transmitting connection comprises a cylindrical post 41 depending from the underframe at the center of the truck, i.e., substantially at the center of the space defined by transoms 11 and 13 and side members 7. A normally transversely disposed lever 43 is centrally apertured at 45 and is thereby fulcrumed on post 41, on which it is retained by an underlying shoulder formed by a washer 46 removably secured to the bottom of post 41 by nut 48. The ends of lever 43 are formed with upright webs 47 disposed transversely of the truck. The latter are centrally apertured as at 49 to permit the passage therethrough of the rod 51 of an anchor link 53R and 53L of the type disclosed in Vernon F. Green Reissue U.S. Pat. No. 21,987. Anchor links 53R and 53L are connected at one end to the right and left ends of lever 43 by elastomeric annular pads held against the opposite surfaces of webs 47 by washers 57 and spacer annular end plates 59. The anchor links extend in opposite directions longitudinally of the truck, and transoms 11 and 13 are provided with upstanding brackets each having a transverse upright web 61, through which the other end of rod 51 passes and to which each link is secured in the same manner as to lever webs 47.

Traction and braking forces are transmitted from the truck frame transoms 11 and 13 to lever 43, through compression of one of links 53R and 53L and tension in the other depending on the direction of operation. Swivel of the truck with respect to the underframe and lateral movements of the underframe on the truck as may be accommodated through horizontal shear in elastomeric pads 33, is permitted, respectively, by pivoting of lever 43 about fulcrum post 41 and by angling of links 53R and 53L about their connections to lever 43 and transoms 11 and 13, accompanied by necessary pivoting of lever 43 about fulcrum post 41. To minimize shear resistance of the pad devices to swivel, pads 33 are preferably elongated radially of the pivot axis.

Operation of a locomotive equipped with a pair of trucks is as follows: When energized, motors M2, M3 and M4 drive their respective axles 2, 3 and 4 through gear boxes G, and, by reason of the positioning of the motors with all their noses N facing in the same direction longitudinally of the truck, the motor reactions in the frame are all in the same direction, all tending either to depress or raise the frame, but not to tilt it as would be the case if the motors faced in opposite directions. The stability of the truck frame against longitudinal tilting is enhanced by the longitudinal spacing of elastomeric pad devices 27, 29, 31, 33 by which underframe U is supported. Traction forces are transmitted from both trucks by links 53R and 53L to levers 43 and through posts 41 to the underframe. As the trucks move along the track, wheels 1 and axles 2, 3 and 4 are permitted to move vertically differentially with respect to the truck frame by deflection of frame supporting coil springs 21, to accommodate the wheels to vertical curvature irregularities in the rails. Movement of underframe U laterally of the trucks to cushion against lateral forces imparted to the wheels, axles and truck frames by transverse irregularities in the track is permitted by lateral shear in elastomeric pads 29 and by lateral swinging of links 53R and 53L about their connections to lever webs 47 and truck frame transom bracket webs 61, the foreshortening of the longitudinal component of the distance between the respective anchor link ends being compensated for by pivoting of lever 43 about post 41. While rounding a curve, swivel of the trucks relative to the underframe is by horizontal shear in pads 29 in a direction arcuate about post 41 and accommodated by swinging of lever 43 about fulcrum post 41, and, since such swivel is normally accompanied by lateral movements of the underframe on the trucks, the necessary lateral swinging of anchor links 53L and 53R is compensated for by increments or decrements in the pivotal movements of lever 43, depending on the direction of truck swivel, the direction of lateral thrusts and the longitudinal direction in which the locomotive is traveling.

Details of the arrangement may be varied substantially without departing from the spirit of the invention and the exclusive use of those modifications as come within the scope of the appended claims is contemplated.

I claim:

1. In a railway vehicle truck, at least three wheeled axles including a pair of end axles and a middle axle, a rigid frame resiliently supported on said axles and comprising longitudinally extending transversely spaced side members and a pair of longitudinally spaced transversely extending transoms located respectively between said middle axle and said end axles, two pairs of longitudinally and transversely spaced elastomeric pad devices on top of said truck frame in the regions of the intersections of said side members and transoms, each of said pad devices being secured at its bottom to said truck frame against horizontal movement with respect thereto, the tops of said pad devices being adapted for similar securement to the bottom of a supported underframe, said pad devices being yieldable in horizontal shear to accommodate lateral movements of the underframe on the truck and swivel movements of the truck with respect to the supported underframe, a traction motor in the space defined by said side members and transoms, traction connection means comprising a transverse lever adapted to be pivoted to the supported underframe on a vertical axis substantially at the center of the space defined by said side members and transoms, a pair of links pivotally secured respectively to the opposite ends of said lever and extending in opposite directions longitudinally of the truck therefrom, said lever and said links being at a generally higher level than the tops of said transoms, the ends of said links remote from said lever being pivotally connected respectively to said transoms.

2. In a railway vehicle truck according to claim 1, wherein said truck frame has a third transverse transom located longitudinally outboard of one of said end axles, transverse motors drivingly connected to each of said end axles and having their reaction connections to said frame transoms all in the same direction from their respective axles.

3. In a railway vehicle truck according to claim 1, said pad devices being of rectangular shape in plan elongated radially with respect to the vertical pivot axis of said traction lever.

4. In a railway vehicle truck according to claim 1, said elastomeric pad devices comprising a plurality of flat elastomeric pads, metal plates interleaving said pads, and top and bottom plates having means for securement respectively to a supported underframe and to said truck frame, all of said plates being bonded to adjacent pads.

5. In a railway vehicle truck according to claim 1, wherein said lever is formed with upright webs transversely of the truck at its ends and said truck frame is formed with similar webs substantially aligned longitudinally of the truck with said lever webs, said links having portions extending through said aligned webs and elastomeric pads compressed between said links and opposite surfaces of both said webs.

6. In a railway vehicle truck according to claim 5, said link portions extending through said webs comprising elongated rodlike elements, each of said links also having a tubular spacer element surrounding said rodlike element and having its ends in compressive relation on said elastomeric pads adjoining one surface of each of said transverse webs, said spacer elements transmitting compressive forces from said truck frame to said lever.

7. In a railway vehicle truck according to claim 6, abutment elements on the end portions of said rodlike element compressing said pads adjoining the adjacent sides of said transverse webs against said transverse webs and transmitting tensile forces from said truck frame to said lever.

* * * * *